(12) United States Patent
Lin et al.

(10) Patent No.: US 10,732,383 B2
(45) Date of Patent: Aug. 4, 2020

(54) OPTICAL LENS

(71) Applicant: Young Optics Inc., Hsinchu (TW)

(72) Inventors: Ying-Hsiu Lin, Hsinchu (TW);
Kuo-Chuan Wang, Hsinchu (TW)

(73) Assignee: Young Optics inc., Hsinchu (TW)

( * ) Notice: Subject to any disclaimer, the term of this patent is extended or adjusted under 35 U.S.C. 154(b) by 81 days.

(21) Appl. No.: 15/016,300

(22) Filed: Feb. 5, 2016

(65) Prior Publication Data

US 2017/0227733 A1 Aug. 10, 2017

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 13/006* (2013.01); *G02B 27/0006* (2013.01); *G02B 27/0025* (2013.01)

(58) Field of Classification Search
CPC ... G02B 9/00; G02B 9/60; G02B 9/62; G02B 9/64; G02B 13/00; G02B 13/001; G02B 13/0015; G02B 13/002; G02B 13/0045; G02B 13/04
USPC ........ 359/708, 713, 749, 750, 751, 754, 755
See application file for complete search history.

(56) References Cited

U.S. PATENT DOCUMENTS

| | | | |
|---|---|---|---|
| 5,107,371 A * | 4/1992 | Shibata | .............. B29D 11/0073 359/355 |
| 7,023,628 B1 | 4/2006 | Ning | |
| 7,046,458 B2 | 5/2006 | Nakayama | |
| 7,283,312 B2 | 10/2007 | Kawada | |
| 8,441,746 B2 * | 5/2013 | Hsieh | ...................... G02B 13/06 359/708 |
| 8,675,127 B2 * | 3/2014 | Nakajima | ............ H04N 5/2253 348/359 |
| 9,057,865 B1 * | 6/2015 | Hsu | ..................... G02B 13/0045 |

FOREIGN PATENT DOCUMENTS

| | | | | |
|---|---|---|---|---|
| CN | 1261787 | 6/2006 | | |
| JP | 47-42169 | 10/1972 | | |
| JP | 2005-227426 | 8/2005 | | |
| KR | 2017 0028795 A1 * | 3/2017 | ............ | G02B 13/06 |
| TW | 201508313 | 3/2015 | | |
| WO | 2013069264 | 5/2013 | | |
| WO | 2015060166 | 4/2015 | | |
| WO | WO 2017039396 A1 * | 9/2017 | ............ | G02B 13/06 |

OTHER PUBLICATIONS

G. Khanarian et. al. (Optical properties of cyclic olefin coplolymers, Optical engineering, 40(6), 1024-1029).*
"Office Action of Taiwan Counterpart Application," dated Feb. 13, 2019, p. 1-p. 4.

* cited by examiner

Primary Examiner — Robert E. Tallman
(74) Attorney, Agent, or Firm — JCIPRNET

(57) ABSTRACT

An optical lens including a first lens group and a second lens group is provided. The first lens group is arranged between a magnified side and a minified side. The first lens group includes three lenses. A surface of a second lens facing to the minified side is a convex aspherical surface. The second lens group includes three lenses. Each of the first lens group and the second lens group includes at least one aspherical lens.

19 Claims, 12 Drawing Sheets

OPTICAL LENS

BACKGROUND OF THE INVENTION

Field of the Invention

The invention relates to an optical device, and particularly relates to an optical lens.

Description of Related Art

Along with development of modern video technology, image devices such as digital video cameras (DVC) and digital cameras (DC) are widely used, and are widely applied in various domains. A core element of these image devices is a lens, which is used for clearly imaging an image on a screen or a charge coupled device (CCD). Moreover, smart home surveillance cameras are quickly developed in recent years, and people have increasingly high demands on thinning appearance and optical performance thereof. In order to satisfy the above demands, the lens is required to have characteristics of a wide field of view (FOV), miniaturization, a thinning appearance, a high resolution, a large aperture, a low distortion, day and night co-focal, etc.

Therefore, how to fabricate a lens having the aforementioned characteristics and capable of providing good optical quality is an important issue for those technicians of the field.

SUMMARY OF THE INVENTION

The invention relates to an optical lens having a wide field of view (FOV) angle, and capable of providing good optical quality.

An embodiment of the invention provides an optical lens including a first lens group and a second lens group. The first lens group is arranged between a magnified side and a minified side. The first lens group includes a first lens and a second lens sequentially arranged from the magnified side to the minified side. A surface of the second lens facing to the minified side is a convex surface. The second lens group is arranged between the first lens group and the minified side. The second lens group includes a third lens. The optical lens is complied with conditions of FOV ≥160 degrees, F<2.0 and 4<L/H<6, where FOV is a field of view of the optical lens, L is a total track length between a surface of the first lens facing to the magnified side and a minified side imaging plane, H is an imaging height of the minified side imaging plane, and F is f-number.

According to the above descriptions, in the embodiments of the invention, the design of the optical lens is complied with the predetermined conditions and standards, so that the optical lens has a wide FOV angel, and is capable of providing good optical quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention will now be described more fully with reference to the accompanying drawings, in which exemplary embodiments of the invention are shown.

The terms used herein such as "above", "below", "front", "back", "left" and "right" are for the purpose of describing directions in the figures only and are not intended to be limiting of the invention.

Figure 1A:
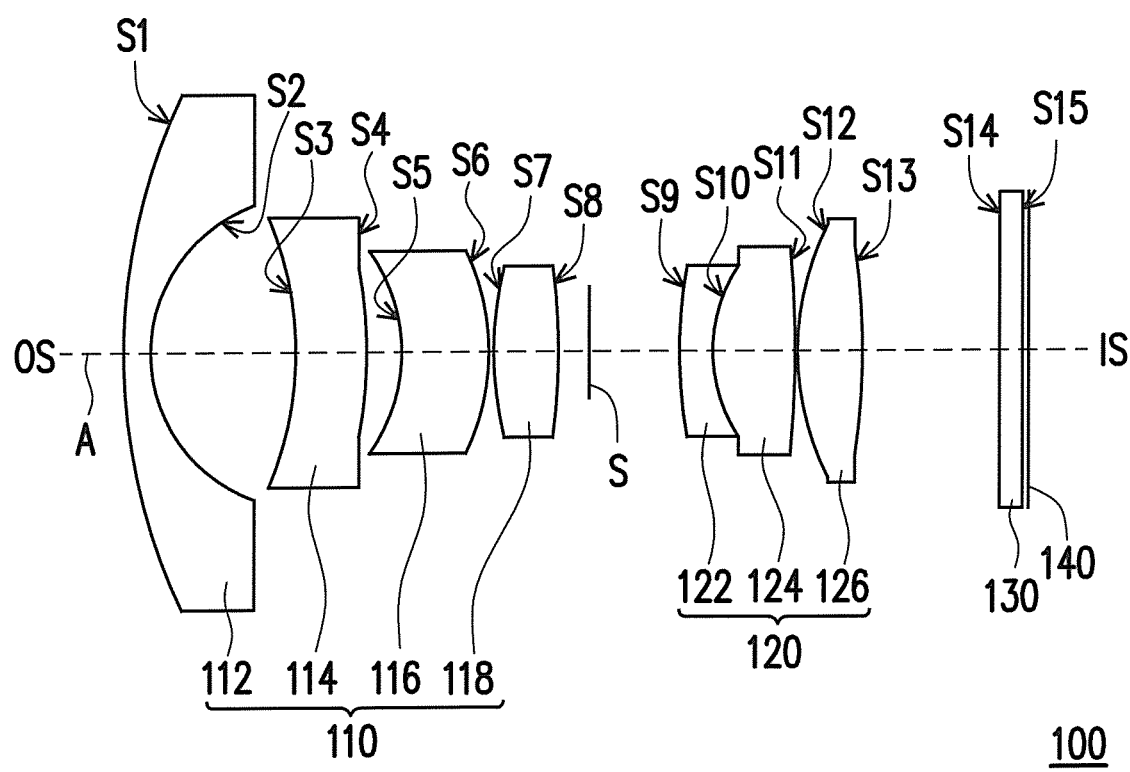
FIG. 1A is a schematic diagram of an optical lens according to an embodiment of the invention.
Figure 1B:
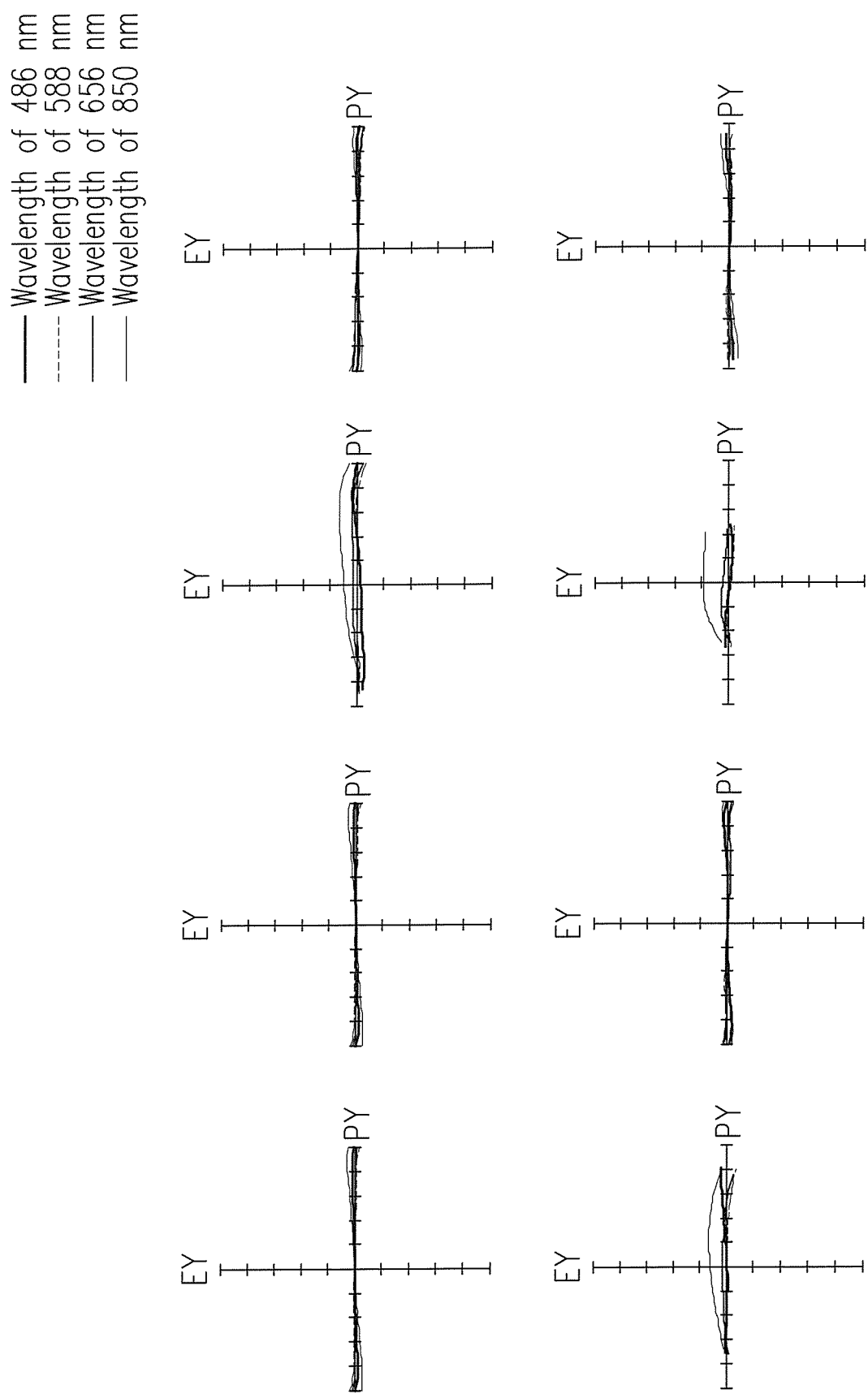
FIG. 1B, FIG. 1C and FIG. 1D are imaging optical simulation data plots of the optical lens of FIG. 1A.
Figure 1C:
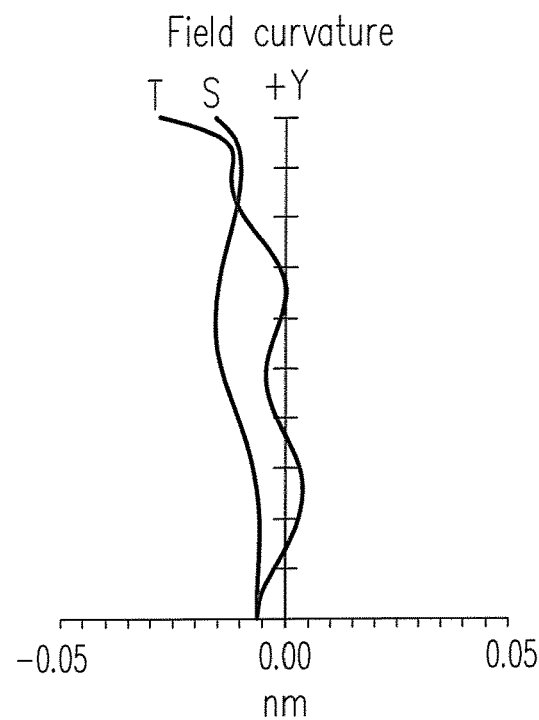
Figure 1D:
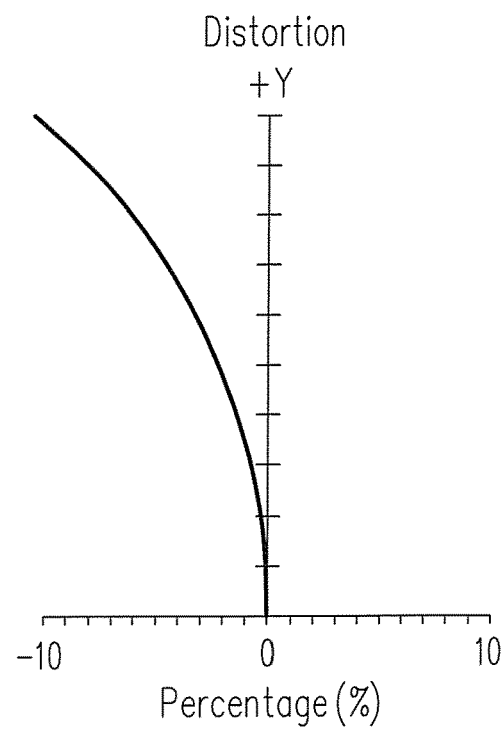

FIG. 1A is a schematic diagram of an optical lens according to an embodiment of the invention. Referring to FIG. 1A, the optical lens 100 of the present embodiment is located between is arranged between a magnified side OS and a minified side IS. The optical lens 100 includes a first lens group 110 and a second lens group 120. The first lens group 110 is arranged between the magnified side OS and the second lens group 120. The second lens group 120 is arranged between the first lens group 110 and the minified side IS, an aperture S is arranged between the first lens group 110 and the second lens group 120, and the first lens group 110 and the second lens group 120 are arranged along an optical axis A of the optical lens 100.

In the present embodiment, the lens group 110 includes a first lens (L1) 112, a second lens (L2) 114, a fourth lens (L4) 116 and a seventh lens (L7) 118 sequentially arranged from the magnified side OS to the minified side IS, and refractive powers thereof are respectively negative, negative, negative and positive. The second lens group 120 includes a fifth lens (L5) 122, a sixth lens (L6) 124 and a third lens (L3) 126 sequentially arranged from the magnified side OS to the minified side IS, and refractive powers thereof are respectively negative, positive and positive. In an embodiment, after the optical lens 100 is assembled, the first lens 112 is coupled to an O-ring suitable for waterproof.

In the present embodiment, the first lens 112 is a glass lens. The second lens 114, the fourth lens 116 and the third lens 126 are aspherical lenses. In other words, each of the first lens group 110 and the second lens group 120 includes at least one aspherical lens. In the present embodiment, the fifth lens 122 and the sixth lens 124 construct a cemented lens. A surface S4 of the second lens 114 facing to the minified side IS is a convex aspherical surface.

In the present embodiment, the optical lens 100 is complied with following conditions (1) to (3):

$$FOV \geq 160 \text{ degrees} \tag{1}$$

$$F<2 \tag{2}$$

$$4<L/H<6 \tag{3}$$

where FOV is a field of view of the optical lens 100 or a maximum field of view in one dimension, L is a total track length of the optical lens 100, which is a distance between a first surface S1 of the first lens 112 and a minified side imaging plan 140 along the optical axis A, H is an imaging height of the minified side imaging plane 140, F is a f-number. In this way, the optical lens 100 complied with the aforementioned conditions may have good optical imaging quality and good optical characteristics.

In the present embodiment, a glass cover 130 and an image sensor can be set at the minified side IS, and an imaging plane thereof is indicated as 140. The glass cover 130 is arranged between the second lens group 120 and the minified side imaging plane 140. The glass cover 130 has two surfaces S14 and S15. The optical lens 100 produces images on the minified side imaging plane 140.

Specific data of each of the lenses in the optical lens 100 of FIG. 1A is listed in the following table 1.

TABLE ONE

| Surface No. | Radius of curvature (mm) | Gap (mm) | Refractive index | Abbe number | Remark |
|---|---|---|---|---|---|
| S1 | 11.78 | 0.55 | 1.91 | 35.25 | L1 |
| S2 | 3.13 | 2.87 | | | |
| S3 | −3.97 | 1.41 | 1.54 | 56.10 | L2 |
| S4 | −5.75 | 0.64 | | | |
| S5 | −3.23 | 1.71 | 1.54 | 56.10 | L4 |
| S6 | −4.37 | 0.10 | | | |
| S7 | 7.59 | 1.23 | 1.91 | 35.25 | L7 |
| S8 | −15.42 | 2.50 | | | |
| S9 | 77.28 | 0.51 | 1.95 | 17.98 | L5 |
| S10 | 3.00 | 1.53 | 1.81 | 40.93 | L6 |
| S11 | −58.57 | 0.10 | | | |
| S12 | 5.18 | 1.32 | 1.54 | 56.10 | L3 |
| S13 | −12.18 | 3.26 | | | |
| 140 | | | | | Imaging plane |

In the table 1, the gap refers to a straight-line distance between adjacent surfaces along the optical axis A. For example, a gap of the surface S1 refers to a straight-line distance between the surface Si and the surface S2 along the optical axis A. The table 1 records thickness, refractive indexes and Abbe numbers of each of the lenses, and a remark column records the corresponding lenses. Moreover, in the table 1, the surfaces S1 and S2 are two surfaces of the first lens 112, the surfaces S3 and S4 are two surfaces of the second lens 114, the surfaces S5 and S6 are two surfaces of the fourth lens 116, the surfaces S7 and S8 are two surfaces of the seventh lens 118, the surface S9 is a surface of the fifth lens 122, the surface S10 is a connected surface of the fifth lens 122 and the sixth lens 124, the surface S11 is a surface of the sixth lens 124 facing to the minified side IS, and the surfaces S12 and S13 are two surfaces of the third lens 126.

In the present embodiment, the surfaces S3, S4, S5, S6, S12 and S13 are aspherical surfaces, which can be represented by the following equation (4):

$$Z = \frac{cr^2}{1+\sqrt{1-(1+k)c^2r^2}} + A_2r^2 + A_4r^4 + A_6r^6 + A_8r^8 + A_{10}r^{10} + A_{12}r^{12} + A_{14}r^{14} + A_{16}r^{16} + \ldots \quad (4)$$

In the equation (4), Z is a sag along the direction of the optical axis A, c is a reciprocal of a radius of an osculating sphere, i.e., a reciprocal of the radius of curvature close to the optical axis A (for example, the radius of curvature of the surfaces S3 to S6 and S12 to S13). k is a conic coefficient, r is a height of the aspherical surface, i.e., a height from a lens center to a lens edge, and $A_2$, $A_4$, $A_6$, $A_8$, $A_{10}$, $A_{12}$, $A_{14}$ and $A_{16}$ ... are aspheric coefficients, and in the present embodiment the aspheric coefficient $A_2$ is 0. The following table 2 lists parameter values of the surfaces S3-S6 and S12 to S13.

TABLE 2

| | k | $A_4$ | $A_6$ | $A_8$ |
|---|---|---|---|---|
| S3 | −0.29 | 9.95E-03 | −3.86E-04 | 1.87E-05 |
| S4 | −0.46 | 1.06E-02 | −8.42E-04 | 3.11E-04 |
| S5 | 4.39E-03 | −5.26E-04 | 9.47E-05 | 4.39E-03 |
| S6 | 5.73E-04 | −2.15E-04 | 1.81E-04 | 5.73E-04 |
| S12 | −0.76 | −3.11E-04 | −3.90E-04 | 2.09E-04 |
| S13 | 7.49 | 3.70E-03 | −1.23E-03 | 5.72E-04 |

| | $A_{10}$ | $A_{12}$ | $A_{14}$ | $A_{16}$ |
|---|---|---|---|---|
| S3 | 2.95E-06 | −9.34E-07 | 1.16E-07 | −5.08E-09 |
| S4 | −1.45E-04 | 4.88E-05 | −8.75E-06 | 6.53E-07 |
| S5 | 9.14E-05 | −4.02E-05 | 7.11E-06 | −4.27E-07 |
| S6 | −6.37E-05 | 1.21E-05 | −1.12E-06 | 4.05E-08 |
| S12 | −5.59E-05 | 8.89E-06 | −7.34E-07 | 2.64E-08 |
| S13 | −1.50E-04 | 2.26E-05 | −1.79E-06 | 6.16E-08 |

According to the above description, in the optical lens 100 of the present embodiment, the f-number (Fno) is 2.0, the FOV is 185 degrees, the total track length (TTL) L is 18 mm, and a ratio between the total track length L and the imaging height H of the minified side imaging plane is L/H=5.9.

It should be noticed that reference numbers of the components and a part of contents of the aforementioned embodiment are also used in the following embodiment, where the same reference numbers denote the same or like components, and descriptions of the same technical contents are omitted. The aforementioned embodiment can be referred for descriptions of the omitted parts, and detailed descriptions thereof are not repeated in the following embodiment.

Figure 2A:
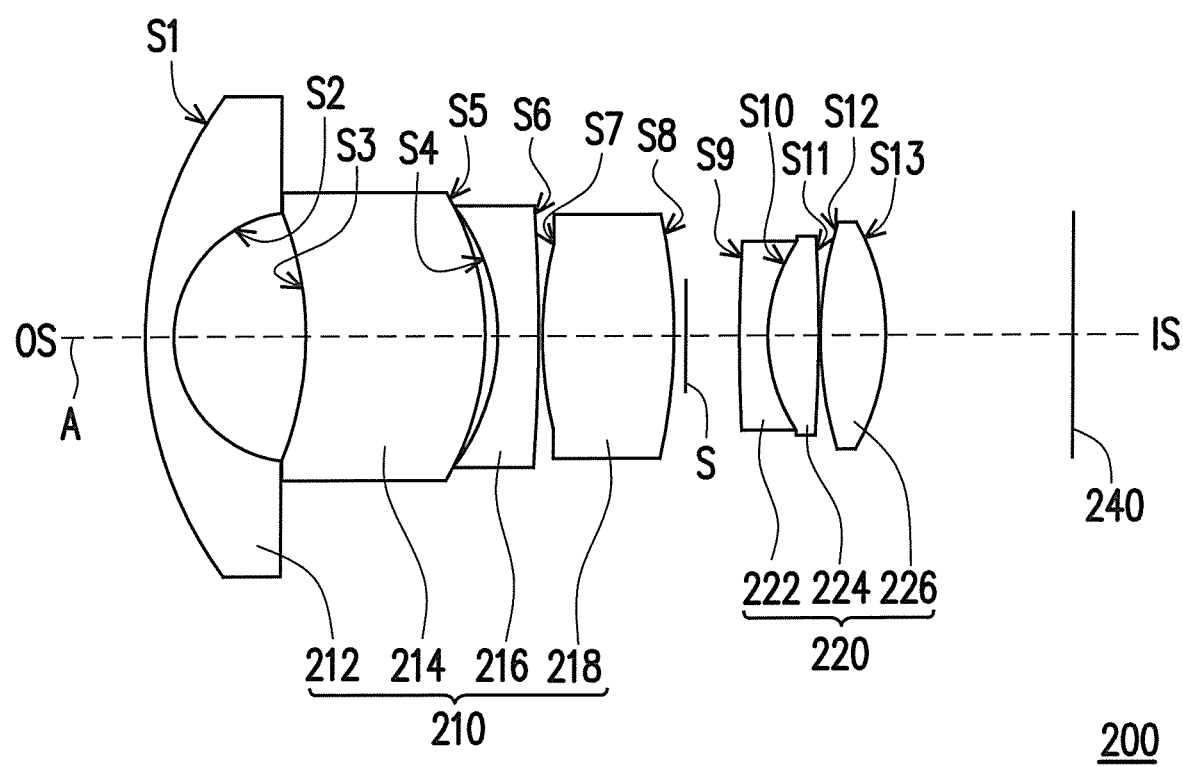
FIG. 2A is a schematic diagram of an optical lens according to another embodiment of the invention.
Figure 2B:
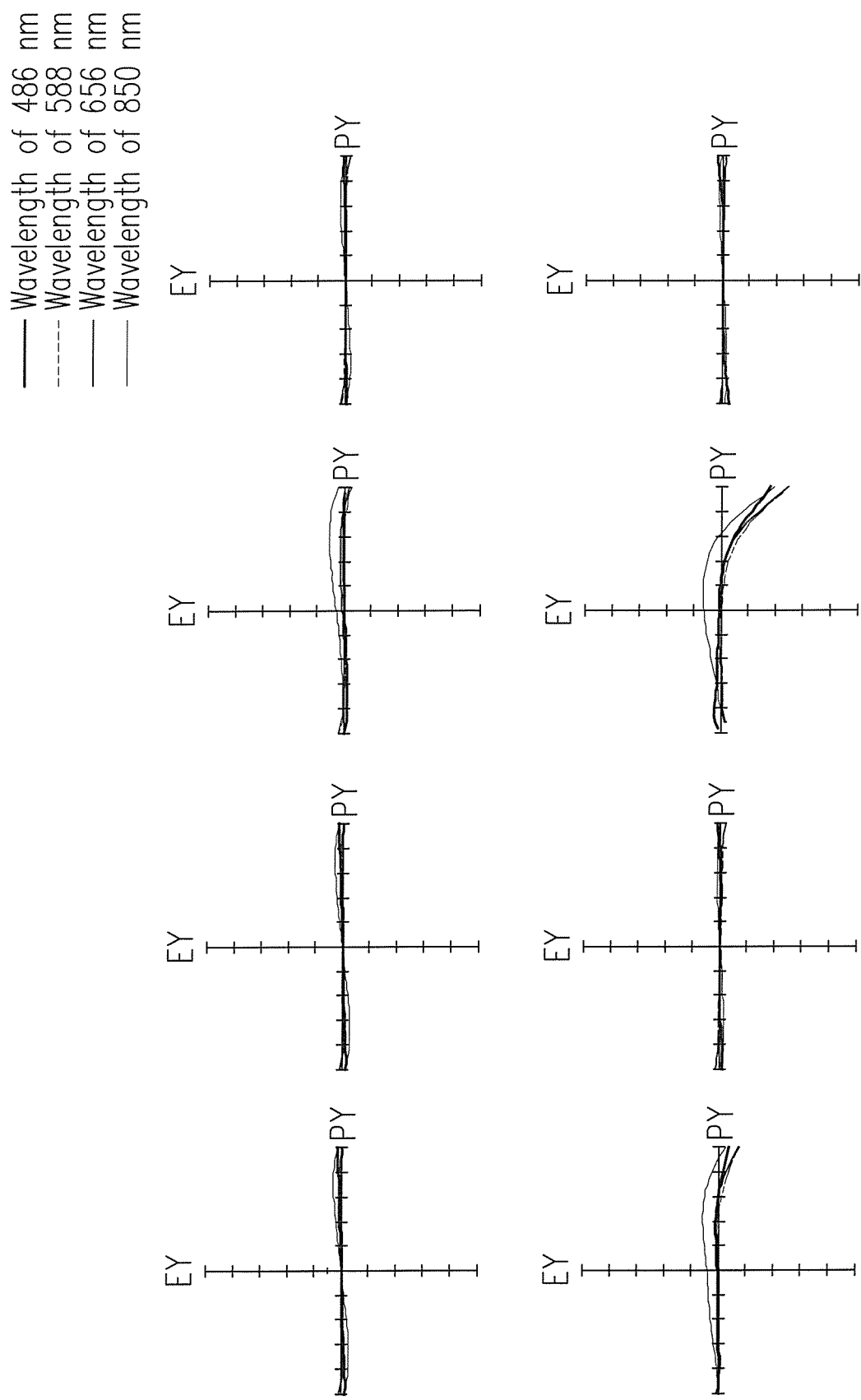
FIG. 2B, FIG. 2C and FIG. 2D are imaging optical simulation data plots of the optical lens of FIG. 2A.
Figure 2C:
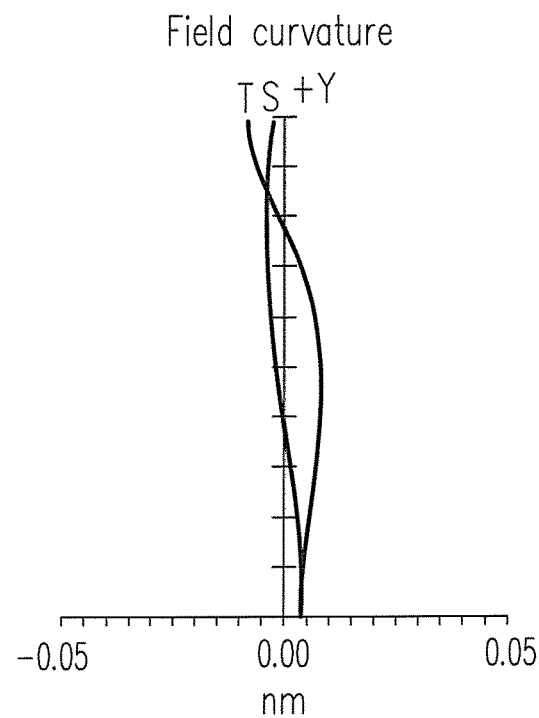
Figure 2D:
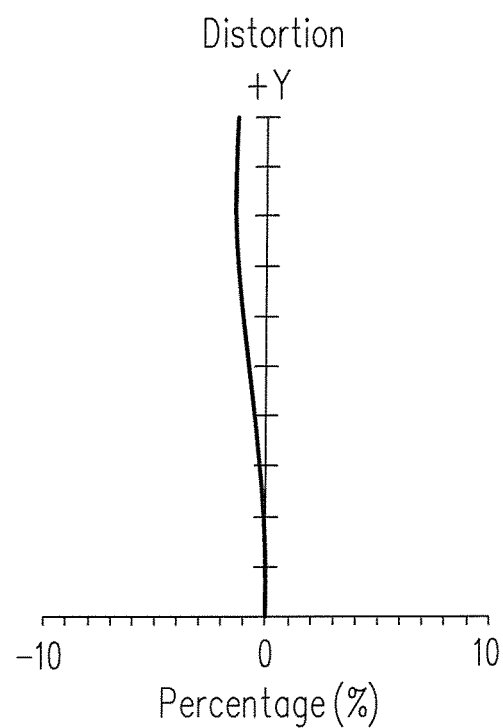

FIG. 2A is a schematic diagram of an optical lens according to another embodiment of the invention. Referring to FIG. 1A and FIG. 2A, a main difference between the optical lens 200 of the present embodiment and the optical lens 100 is that the second lens 214 has a positive refractive power, and the surface S 11 of the sixth lens 224 facing to the minified side IS is a concave surface.

Specific data of each of the lenses in the optical lens 200 of FIG. 2A is listed in the following table 3.

TABLE 3

| Surface No. | Radius of curvature (mm) | Gap (mm) | Refractive index | Abbe number | Remark |
|---|---|---|---|---|---|
| S1 | 8.76 | 0.60 | 1.88 | 40.80 | L1 |
| S2 | 2.72 | 3.00 | | | |
| S3 | −5.72 | 3.87 | 1.89 | 30.60 | L2 |
| S4 | −4.58 | 0.27 | | | |
| S5 | −3.19 | 0.90 | 1.50 | 81.50 | L4 |
| S6 | −14.99 | 0.10 | | | |
| S7 | 10.02 | 2.84 | 1.88 | 40.80 | L7 |
| S8 | −12.76 | 1.39 | | | |
| S9 | 41.37 | 0.60 | 1.92 | 18.90 | L5 |
| S10 | 3.70 | 1.03 | 1.79 | 44.30 | L6 |
| S11 | 99.38 | 0.10 | | | |
| S12 | 6.17 | 1.42 | 1.50 | 79.40 | L3 |
| S13 | −5.11 | 4.06 | | | |
| 140 | | | | | Imaging plane |

Interpretation of various optical parameters and data in the table 3 may refer to related description of the table 1. In the present embodiment, the surfaces S3, S4, S5, S6, S12 and S13 are aspherical surfaces, which can be represented by the aforementioned equation (4). The following table 4 lists parameter values of the surfaces S3 to S6 and S12 to S13. In the present embodiment, the coefficients $A_2, A_{10}, A_{12}, A_{14}$ and $A_{16}$ are 0.

TABLE 4

| | k | $A_4$ | $A_6$ | $A_8$ |
|---|---|---|---|---|
| S3 | 0 | 3.04E−03 | −4.78E−05 | −2.75E−06 |
| S4 | 0 | 4.79E−03 | −3.87E−04 | 1.69E−05 |
| S5 | 0 | 9.70E−03 | −6.91E−04 | 8.57E−05 |
| S6 | 0 | 1.97E−03 | 1.25E−04 | 1.29E−06 |
| S12 | 0 | −3.54E−03 | −1.17E−05 | 0 |
| S13 | 0 | 5.37E−04 | −7.89E−05 | 0 |

According to the above description, in the optical lens 200 of the present embodiment, the f-number is 2.0, the FOV is 164 degrees, the total track length L is 20 mm, and a ratio between the total track length L and the imaging height H of the minified side imaging plane is L/H=5.9.

Figure 3A:
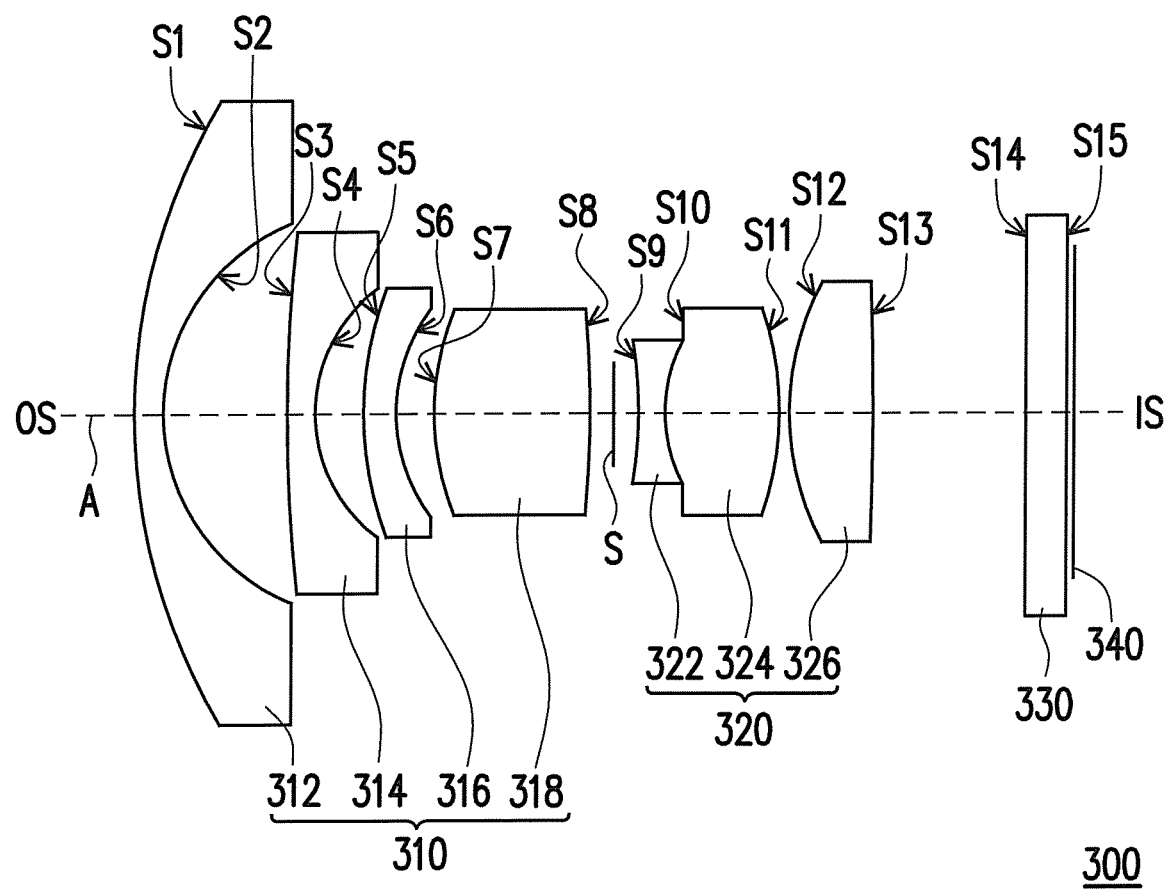
FIG. 3A is a schematic diagram of an optical lens according to another embodiment of the invention.
Figure 3B:
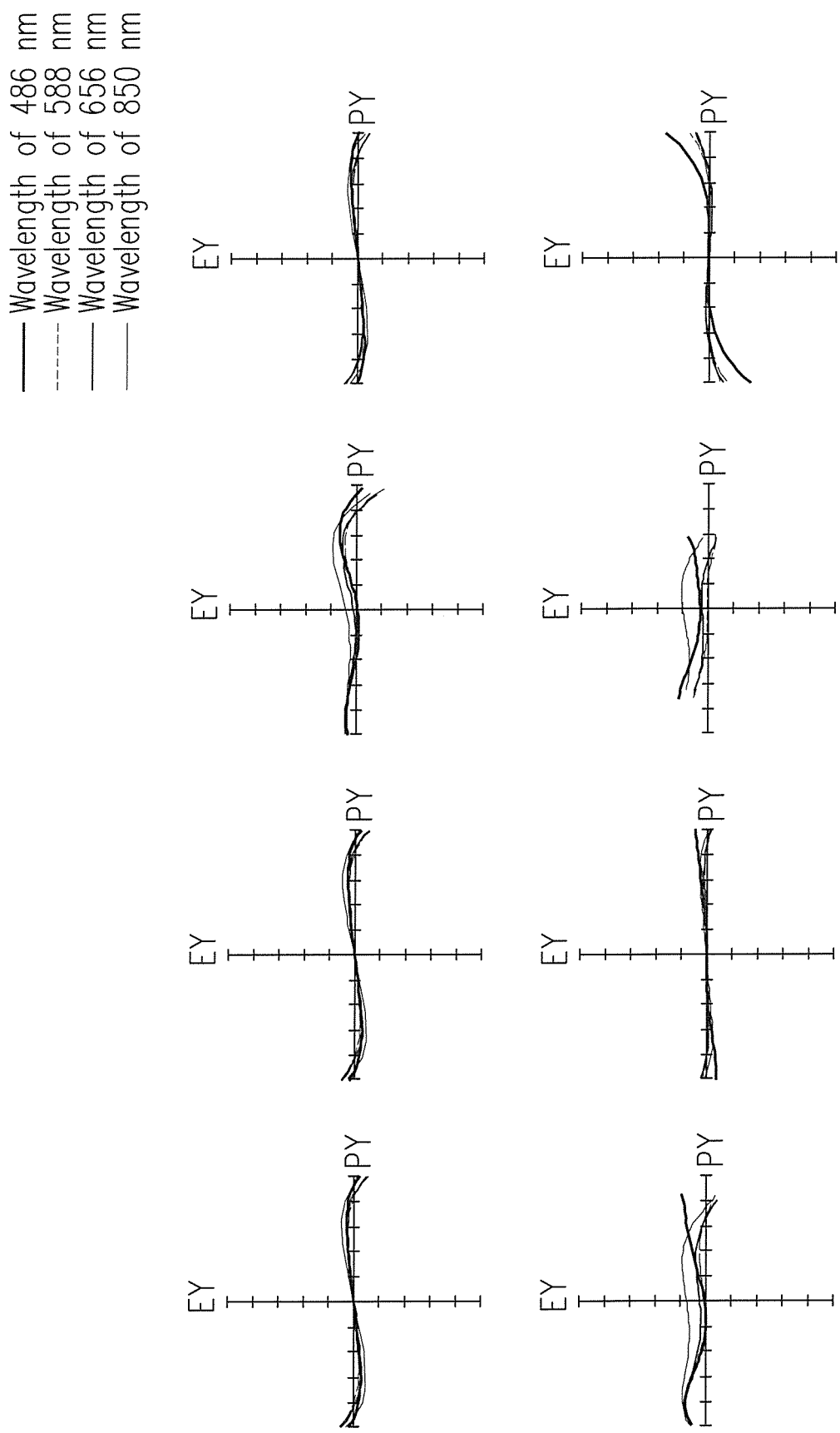
FIG. 3B, FIG. 3C and FIG. 3D are imaging optical simulation data plots of the optical lens of FIG. 3A.
Figure 3C:
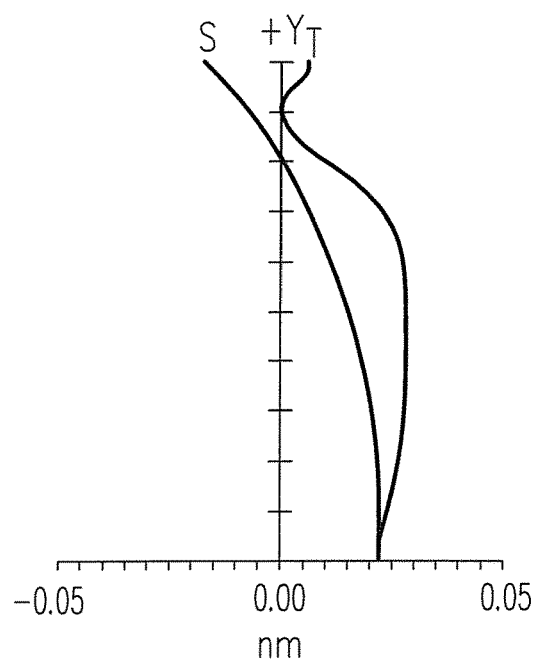
Figure 3D:
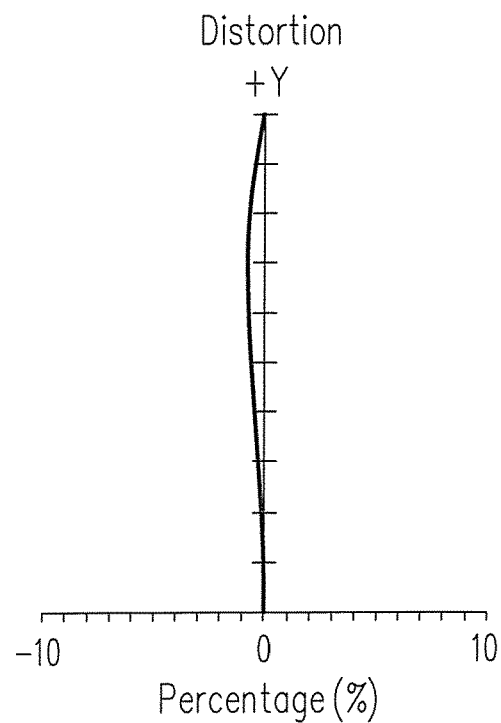

FIG. 3A is a schematic diagram of an optical lens according to another embodiment of the invention. Referring to FIG. 1A and FIG. 3A, a main difference between the optical lens 300 of the present embodiment and the optical lens 100 is that the fourth lens 316 is a spherical lens; the surface S3 of the second lens 314 facing to the magnified side OS is a convex surface, and the surface S4 of the second lens 314 facing to the minified side IS is a concave surface; the surface S5 of the fourth lens 316 facing to the magnified side OS is a convex surface, and the surface S6 of the fourth lens 316 facing to the minified side IS is a concave surface; and a surface S9 of the fifth lens 322 facing to the magnified side OS is a concave surface.

Specific data of each of the lenses in the optical lens 300 of FIG. 3A is listed in the following table 5.

TABLE 5

| Surface No. | Radius of curvature (mm) | Gap (mm) | Refractive index | Abbe number | Remark |
|---|---|---|---|---|---|
| S1 | 11.56 | 0.55 | 1.77 | 49.60 | L1 |
| S2 | 3.85 | 2.34 | | | |
| S3 | 24.56 | 0.55 | 1.53 | 55.75 | L2 |
| S4 | 3.17 | 0.92 | | | |
| S5 | 7.83 | 0.55 | 1.50 | 81.55 | L4 |
| S6 | 3.19 | 0.74 | | | |
| S7 | 5.44 | 3.00 | 1.92 | 24.00 | L7 |
| S8 | −7.51 | 0.84 | | | |
| S9 | −6.86 | 0.55 | 1.92 | 18.90 | L5 |
| S10 | 3 | 2.20 | 1.88 | 40.77 | L6 |
| S11 | −5.62 | 0.10 | | | |
| S12 | 5.44 | 1.57 | 1.53 | 55.75 | L3 |
| S13 | −15.31 | 3.85 | | | |
| 140 | | | | | Imaging plane |

Interpretation of various optical parameters and data in the table 5 may refer to related description of the table 1. In the present embodiment, the surfaces S3, S4, S12 and S13 are aspherical surfaces, which can be represented by the aforementioned equation (4). The following table 6 lists parameter values of the surfaces S3 to S4 and S12 to S13.

TABLE 6

| | k | $A_4$ | $A_6$ | $A_8$ |
|---|---|---|---|---|
| S3 | −6.86 | 0.55 | 1.92 | 18.90 |
| S4 | 3 | 2.20 | 1.88 | 40.77 |
| S12 | −1.24E−03 | 3.31E−04 | 1.38E−05 | −1.24E−03 |
| S13 | 1.78E−03 | 3.49E−04 | −1.16E−05 | 1.78E−03 |

TABLE 6-continued

| | A10 | A12 | A14 | A16 |
|---|---|---|---|---|
| S3 | 5.12E−07 | 0 | 0 | 0 |
| S4 | −1.26E−05 | 0 | 0 | 0 |
| S12 | 9.21E−07 | 0 | 0 | 0 |
| S13 | 8.16E−06 | 0 | 0 | 0 |

According to the above description, in the optical lens 300 of the present embodiment, the f-number is 2.0, the FOV is 190 degrees, the total track length L is 18 mm, and a ratio between the total track length L and the imaging height H of the minified side imaging plane is L/H=5.9.

Figure 4A:
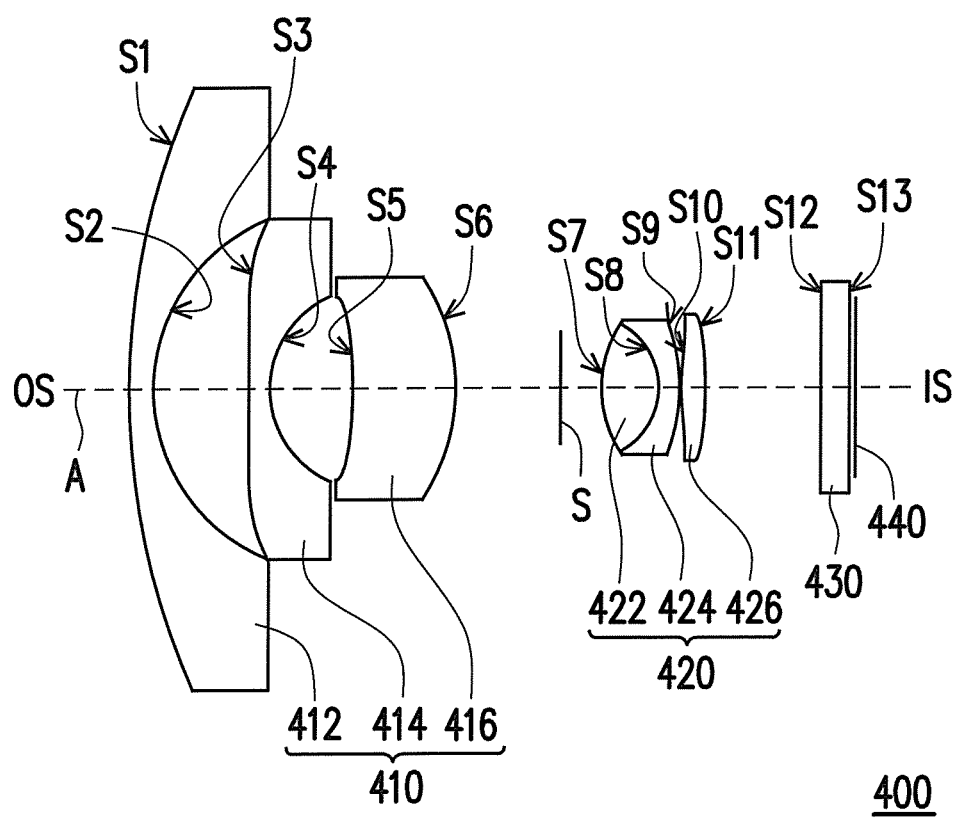
FIG. 4A is a schematic diagram of an optical lens according to another embodiment of the invention.
Figure 4B:
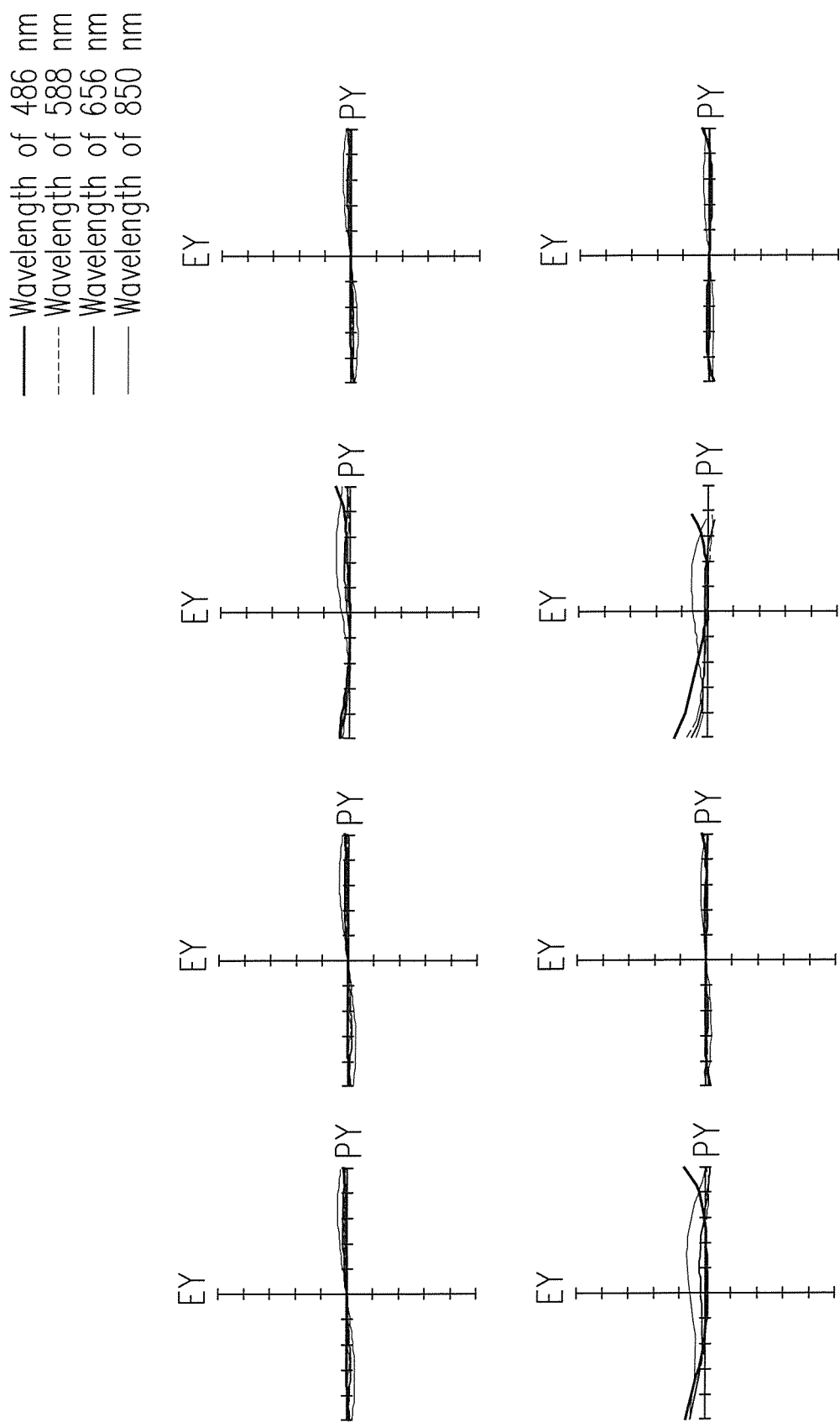
FIG. 4B, FIG. 4C and FIG. 4D are imaging optical simulation data plots of the optical lens of FIG. 4A.
Figure 4C:
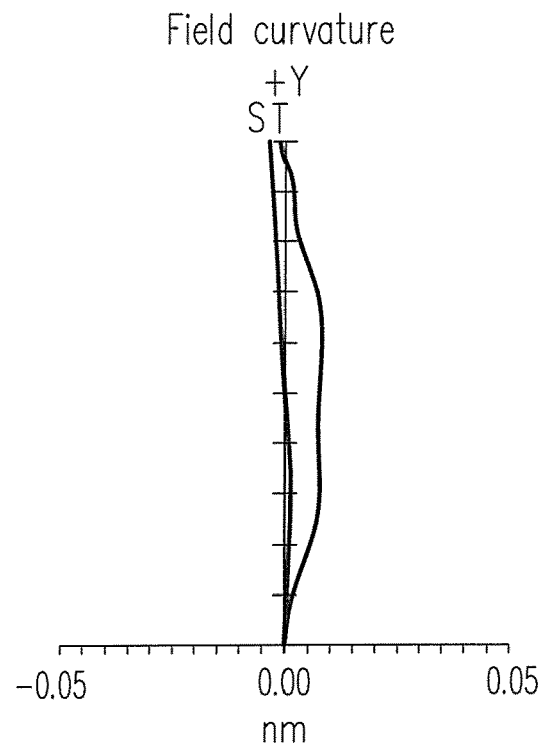
Figure 4D:
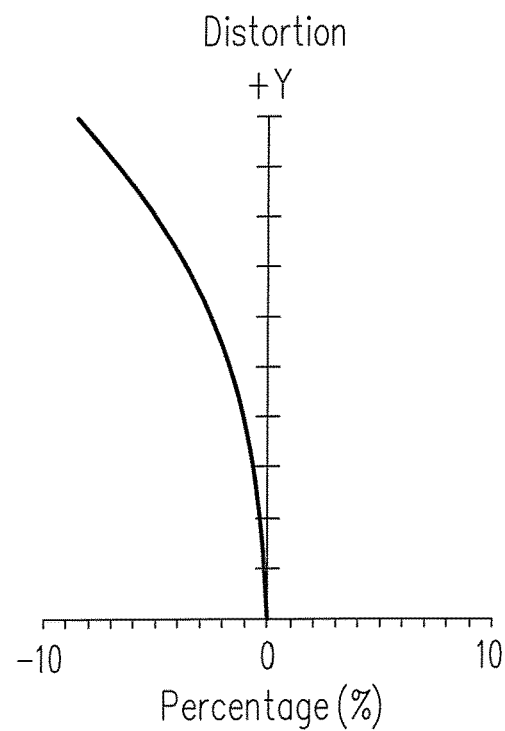

FIG. 4A is a schematic diagram of an optical lens according to another embodiment of the invention. Referring to FIG. 1A and FIG. 4A, a main difference between the optical lens 400 of the present embodiment and the optical lens 100 is that the first lens group 410 of the optical lens 400 includes three lenses, and refractive powers thereof are respectively negative, negative and positive, and the second lens group 420 includes three lenses, and refractive powers thereof are respectively positive negative and positive; the surface S4 of the second lens 414 facing to the minified side IS is a concave surface, and the surface S8 of the fifth lens 422 facing to the minified side IS is a concave surface.

Specific data of each of the lenses in the optical lens 400 of FIG. 4A is listed in the following table 7. It should be noted that the data listed in the table 1 to the following table 8 are not used for limiting the invention, and those skilled in the art may suitably modify the parameters or settings therein with reference of the invention, which is still considered to be within the scope of the invention.

TABLE 7

| Surface No. | Radius of curvature (mm) | Gap (mm) | Refractive index | Abbe number | Remark |
|---|---|---|---|---|---|
| S1 | 19.4 | 0.70 | 1.50 | 81.50 | L1 |
| S2 | 4.98 | 2.53 | | | |
| S3 | −68.51 | 0.60 | 1.54 | 56.10 | L2 |
| S4 | 2.67 | 2.18 | | | |
| S5 | −31.44 | 2.81 | 1.64 | 24.00 | L4 |
| S6 | −6.11 | 3.92 | | | |
| S7 | 6.07 | 1.68 | 1.88 | 40.80 | L5 |
| S8 | −3 | 0.60 | 1.92 | 18.90 | L6 |
| S9 | −17.55 | 0.10 | | | |
| S10 | 10.3 | 0.75 | 1.54 | 56.10 | L3 |
| S11 | −21.71 | 3.64 | | | |
| 140 | | | | | Imaging plane |

Interpretation of various optical parameters and data in the table 7 may refer to related description of the table 1. In the present embodiment, the surfaces S3, S4, S5, S6, S10 and S11 are aspherical surfaces, which can be represented by the aforementioned equation (4). The following table 8 lists parameter values of the surfaces S3 to S6 and S10 to S11.

TABLE 8

| | k | $A_4$ | $A_6$ | $A_8$ |
|---|---|---|---|---|
| S3 | 0 | 9.96E−04 | 5.54E−05 | −2.55E−06 |
| S4 | 0 | −2.81E−03 | −7.33E−04 | 9.47E−05 |
| S5 | 0 | −6.94E−03 | −7.47E−04 | 8.21E−05 |
| S6 | 0 | −2.66E−03 | −7.69E−05 | 3.55E−05 |
| S10 | 0 | −2.60E−03 | 7.74E−07 | −8.34E−05 |
| S11 | 0 | 1.70E−03 | −5.29E−04 | 1.21E−04 |

TABLE 8-continued

| | $A_{10}$ | $A_{12}$ | $A_{14}$ | $A_{16}$ |
|---|---|---|---|---|
| S3 | 5.39E−08 | 0 | 0 | 0 |
| S4 | −9.28E−06 | 0 | 0 | 0 |
| S5 | −3.95E−06 | 0 | 0 | 0 |
| S6 | −2.33E−06 | 0 | 0 | 0 |
| S10 | −8.60E−06 | 6.12E−07 | 0 | 0 |
| S11 | −4.82E−05 | 3.72E−06 | 0 | 0 |

According to the above description, in the optical lens 400 of the present embodiment, the f-number is 2.3, the FOV is 170 degrees, the total track length L is 19.76 mm, and a ratio between the total track length L and the imaging height H of the minified side imaging plane is L/H=5.9.

FIGS. 1B to 1D, FIGS. 2B to 2D, FIGS. 3B to 3D and FIGS. 4B to 4D are imaging optical simulation data plots of the optical lenses of FIG. 1A, FIG. 2A, FIG. 3A and FIG. 4A, where FIG. 1B, FIG. 2B, FIG. 3B and FIG. 4B are transverse ray fan plots, in which an X-axis represents positions where lights passes through the aperture S, and a Y-axis represents positions where the lights are projected on the imaging plane (for example, the imaging plane 440). A color light with a wavelength of 855 nm, a red light with a wavelength of 656 nm, a green light with a wavelength of 588 nm, and a blue light with a wavelength of 486 nm are taken as reference wavebands to perform simulation. FIG. 1C, FIG. 2C, FIG. 3C and FIG. 4C respectively illustrate field curvatures, and Distortions illustrated in FIG. 1D, FIG. 2D, FIG. 3D and FIG. 4D are all simulated by the light with the wavelength of 588 nm. In the four embodiments of the invention, the optical lens has relatively small focal length sag relative to visible lights and infrared light, which is referred to as day and night co-focal. Since the diagrams of the aforementioned figures are all within a standard range, the optical lens of the embodiments may provide good imaging quality under conditions of a wide FOV, miniaturization, a thinning appearance, a high resolution, a large aperture, a low distortion, day and night co-focal, etc.

In summary, in the embodiments of the invention, the design of the optical lens is complied with the predetermined conditions and standards, so that the optical lens of the embodiments may provide good imaging quality under conditions of a wide FOV, miniaturization, a thinning appearance, a high resolution, a large aperture, a low distortion, day and night co-focal, etc.

It will be apparent to those skilled in the art that various modifications and variations can be made to the structure of the embodiments without departing from the scope or spirit of the invention. In view of the foregoing, it is intended that the invention cover modifications and variations of this invention provided they fall within the scope of the following claims and their equivalents.

What is claimed is:

1. An optical lens, comprising:
a first lens group, arranged between a magnified side and a minified side, and comprising a first lens and a second lens sequentially arranged from the magnified side to the minified side, wherein a surface of the second lens facing to the minified side is a convex surface; and
a second lens group, arranged between the first lens group and the minified side, and comprising a third lens, wherein a material of the second lens is plastic having refractive index less than or equal to 1.54,
wherein the optical lens is complied with conditions of 185≥FOV ≥160, F<2.0 and 4<L/H<6, wherein FOV is a field of view of the optical lens, L is a total track length between a surface of the first lens facing to the magnified side and a minified side imaging plane, H is an imaging height of the minified side imaging plane, [and F is f-number.

2. The optical lens as claimed in claim 1, wherein the second lens and the third lens are aspherical lenses.

3. The optical lens as claimed in claim 2, wherein the first lens group further comprises a fourth lens located between the second lens and the second lens group, and the fourth lens is an aspherical lens and the third lens is the closest to the minified side imaging plane.

4. The optical lens as claimed in claim 3, wherein a material of the fourth lens is plastic.

5. The optical lens as claimed in claim 3, wherein the second lens group further comprises a cemented lens constructed by a fifth lens and a sixth lens.

6. The optical lens as claimed in claim 1, wherein the first lens is a glass lens.

7. The optical lens as claimed in claim 1, wherein the first lens is coupled to an O-ring suitable for waterproof 8. An optical lens, comprising:
a first lens group, arranged between a magnified side and a minified side, and comprising a first lens and a second lens sequentially arranged from the magnified side to the minified side, wherein the second lens has an aspherical surface; and
a second lens group, arranged between the first lens group and the minified side, and comprising a third lens, wherein the third lens has an aspherical surface,
wherein a material of the second lens and the third lens is plastic having refractive index less than or equal to 1.54,
wherein the optical lens is complied with conditions of 185≥FOV ≥160, F<2.0 and 4<L/H<6, wherein FOV is a field of view of the optical lens, L is a total track length between a surface of the first lens facing to the magnified side and a minified side imaging plane, H is an imaging height of the minified side imaging plane, and F is f-number.

9. The optical lens as claimed in claim 8, wherein the first lens is a glass lens.

10. The optical lens as claimed in claim 8, wherein the first lens is coupled to an O-ring suitable for waterproof 11. The optical lens as claimed in claim 8, wherein the first lens group further comprises a fourth lens located between the second lens and the second lens group, and the fourth lens is an aspherical lens and the third lens is the closest to the minified side imaging plane.

12. The optical lens as claimed in claim 11, wherein a material of the fourth lens is plastic.

13. The optical lens as claimed in claim 11, wherein the second lens group further comprises a cemented lens constructed by a fifth lens and a sixth lens.

14. An optical lens, comprising:
a first lens group, arranged between a magnified side and a minified side, and comprising a first lens and a second lens sequentially arranged from the magnified side to the minified side, wherein the second lens has an aspherical surface; and
a second lens group, arranged between the first lens group and the minified side, and comprising a third lens, wherein the third lens has an aspherical surface,
wherein the optical lens is complied with conditions of 185≥FOV≥160 degrees, F≤2.3, L<20mm and 4<L/H<6, wherein FOV is a maximum field of view of the optical lens in one dimension, L is a total track length between a surface of the first lens facing to the magnified side and a minified side imaging plane, H is an imaging height of the minified side imaging plane, and F is f-number, wherein a focal shift of the optical lens relative to a light with wavelength of 486 nm and a light with a wavelength of 855 nm is smaller than or equal to 13 μm.

15. The optical lens as claimed in claim 14, wherein the first lens is coupled to an O-ring suitable for waterproof.

16. The optical lens as claimed in claim 14, wherein the first lens group further comprises a fourth lens located between the second lens and the second lens group, and the fourth lens is an aspherical lens and the third lens is the closest to the minified side imaging plane.

17. The optical lens as claimed in claim 16, wherein a material of the second lens and the fourth lens is plastic.

18. The optical lens as claimed in claim 16, wherein the second lens group further comprises a cemented lens constructed by a fifth lens and a sixth lens.

19. The optical lens as claimed in claim 18, wherein the first lens group further comprises a seventh lens located between the fourth lens and the second lens group.

* * * * *